United States Patent
Huang et al.

(10) Patent No.: US 9,535,205 B2
(45) Date of Patent: Jan. 3, 2017

(54) DISPLAY DEVICE

(71) Applicant: E Ink Holdings Inc., Hsinchu (TW)

(72) Inventors: Hsin-Tao Huang, Hsinchu (TW); I-Jeng Chen, Hsinchu (TW); Yao-Tsung Shih, Hsinchu (TW); Shu-Li Hsiao, Hsinchu (TW); Yu-Nan Pao, Hsinchu (TW); Chia-Chuang Hu, Hsinchu (TW)

(73) Assignee: E Ink Holdings Inc., Hsingchu (TW)

( * ) Notice: Subject to any disclaimer, the term of this patent is extended or adjusted under 35 U.S.C. 154(b) by 117 days.

(21) Appl. No.: 14/281,826

(22) Filed: May 19, 2014

(65) Prior Publication Data

US 2015/0003104 A1   Jan. 1, 2015

Related U.S. Application Data

(60) Provisional application No. 61/841,430, filed on Jul. 1, 2013.

(30) Foreign Application Priority Data

Nov. 29, 2013 (TW) .............................. 102143819 A

(51) Int. Cl.
*F21V 7/04* (2006.01)
*F21V 8/00* (2006.01)
(Continued)

(52) U.S. Cl.
CPC .............. *G02B 6/005* (2013.01); *G02F 1/167* (2013.01); *G02B 6/0036* (2013.01); *G02F 2001/133331* (2013.01); *G02F 2001/133616* (2013.01)

(58) Field of Classification Search
CPC ........... G02F 1/133; G02F 1/167; B02B 6/005
(Continued)

(56) References Cited

U.S. PATENT DOCUMENTS 4,248,502 A   2/1981 Bechteler et al.
5,528,720 A   6/1996 Winston et al.
(Continued)

FOREIGN PATENT DOCUMENTS

CN   1362636   8/2002
CN   101965604   2/2011
(Continued)

OTHER PUBLICATIONS

"Office Action of Taiwan Counterpart Application", issued on Aug. 20, 2015, p. 1-p. 10.
(Continued)

*Primary Examiner* — Elmito Breval
*Assistant Examiner* — Matthew Peerce
(74) *Attorney, Agent, or Firm* — Jianq Chyun IP Office

(57) ABSTRACT

A display device including a reflective display panel, a plurality of electrical or optical element layers, and at least one light-emitting element is provided. The electrical or optical element layers are stacked above the reflective display panel. One of the electrical or optical element layers is a light guide plate. The light-emitting element is disposed beside the light guide plate. A plurality of transparent medium layers are respectively located between every two adjacent ones of the reflective display panel and the electrical or optical element layers and above the electrical or optical element layer most away from the reflective display panel among the electrical or optical element layers. At least one of the transparent medium layers above the light guide plate is a gas layer.

10 Claims, 3 Drawing Sheets

(51) Int. Cl.
*G02F 1/167* (2006.01)
*G02F 1/1333* (2006.01)
*G02F 1/1335* (2006.01)

(58) Field of Classification Search
USPC ........................................ 362/606, 607, 608
See application file for complete search history.

(56) References Cited

U.S. PATENT DOCUMENTS

| | | | |
|---|---|---|---|
| 7,659,953 B2 | 2/2010 | Cho | |
| 7,679,702 B2 | 3/2010 | Oura et al. | |
| 2003/0099118 A1 | 5/2003 | Saitoh et al. | |
| 2008/0025046 A1* | 1/2008 | Tsuruta | G02B 6/0036 362/612 |
| 2009/0167990 A1 | 7/2009 | Konno et al. | |
| 2012/0092593 A1* | 4/2012 | Chang | G02B 6/0085 349/67 |
| 2013/0021559 A1* | 1/2013 | Momose | G02B 6/0036 349/65 |
| 2013/0258707 A1* | 10/2013 | Iwasaki | G02B 6/0041 362/607 |
| 2013/0322113 A1* | 12/2013 | Yang | G02B 6/0088 362/606 |
| 2015/0277029 A1* | 10/2015 | Watanabe | G02F 1/133308 362/606 |

FOREIGN PATENT DOCUMENTS

| | | |
|---|---|---|
| CN | 102193679 | 9/2011 |
| CN | 102375279 | 3/2012 |
| CN | 102778977 | 11/2012 |
| EP | 0942228 | 9/1999 |
| JP | 2003066445 | 3/2003 |
| TW | I240814 | 10/2005 |
| TW | 201102986 | 1/2011 |
| TW | 201319623 | 5/2013 |

OTHER PUBLICATIONS

"Office Action of China Counterpart Application", issued on May 5, 2016, p. 1-p. 8.

* cited by examiner

DISPLAY DEVICE

CROSS-REFERENCE TO RELATED APPLICATION

This application claims the priority benefits of U.S. provisional application Ser. No. 61/841,430, filed on Jul. 1, 2013 and Taiwan application serial no. 102143819, filed on Nov. 29, 2013. The entirety of each of the above-mentioned patent applications is hereby incorporated by reference herein and made a part of this specification.

BACKGROUND OF THE INVENTION

Field of the Invention

The invention relates to a display device.

Description of Related Art

Generally, in current display technologies, a display panel may be classified into a transmissive display panel, a reflective display panel, and a self-illuminating display panel. A back side of the transmissive display panel usually includes a backlight module served as a back light source for the transmissive display panel. A disadvantage of the transmissive display panel and the self-illuminating display panel is that, an intensity of a strong light reflected by a surface of the display panel under strong ambient light (e.g., outdoor sunlight) may be overly strong. Accordingly, light from a screen of the transmissive display panel or the self-illuminating display panel may not be clearly viewed by users. In comparison, the reflective display panel is capable of utilizing said strong light from surroundings as a front light source instead, and forming a display screen after reflecting the strong light for the users to view it clearly.

For a display device adopting the reflective display panel to work in case the ambient light is insufficient, a front light module may be disposed on the reflective display panel. Generally, a cover lens is further disposed on a light guide plate of the front light module. In conventional technologies, an optically-clear adhesive (OCA) is used for bonding the light guide plate of the front light module and the reflective display panel, and the optically-clear adhesive is also used for bonding the light guide plate and the cover lens. Since a refractive index of the optically-clear adhesive is similar to a refractive index of the light guide plate, a portion of light transmitted in the light guide plate may penetrate through an interface between the optically-clear adhesive and the light guide plate to be transmitted into the cover lens. A printing layer on the cover lens may reflect or scatter said portion of light, resulting a coupling light leakage at an edge of the display device.

SUMMARY OF THE INVENTION

The invention is directed to a display device capable of effectively suppressing a light leakage at an edge of the display device.

According to an embodiment of the invention, a display device includes a reflective display panel, a plurality of electrical or optical element layers, and at least one light-emitting element. The electrical or optical element layers are stacked above the reflective display panel. One of the electrical or optical element layers is a light guide plate. The at least one light-emitting element is disposed beside the light guide plate and configured to emit a light beam, and the light beam enters inside the light guiding plate through a lateral side of the light guide plate. A plurality of transparent medium layers are respectively located between every two adjacent ones of the reflective display panel and the electrical or optical element layers and above the electrical or optical element layer most away from the reflective display panel among the electrical or optical element layers. At least one of the transparent medium layers above the light guide plate is a gas layer. The transparent medium layer located above the electrical or optical element layer most away from the reflective display panel among the electrical or optical element layers is formed by an environmental medium of a place where the display device is located. The gas layer is located between the electrical or optical element layer most away from the reflective display panel and the reflective display panel when the light guide plate is not the electrical or optical element layer most away from the reflective display panel.

In an embodiment of the invention, the gas layer is located between two adjacent ones of the electrical or optical element layers, and a refractive index of the gas layer is less than refractive indexes of the two adjacent ones of the electrical or optical element layers.

In an embodiment of the invention, a refractive index of the transparent medium layer located above the electrical or optical element layer most away from the reflective display panel is less than the refractive indexes of the two adjacent ones of the electrical or optical element layers.

In an embodiment of the invention, the gas layer is located between two adjacent ones of the electrical or optical element layers, and a refractive index of the gas layer is less than or equal to a refractive index of the transparent medium layer located above the electrical or optical element layer most away from the reflective display panel among the electrical or optical element layers.

According to an embodiment of the invention, a display device includes a reflective display panel, a plurality of electrical or optical element layers, and at least one light-emitting element. The electrical or optical element layers are stacked above the reflective display panel. One of the electrical or optical element layers is a light guide plate. The at least one light-emitting element is disposed beside the light guide plate and configured to emit a light beam, and the light beam enters inside the light guiding plate through a lateral side of the light guide plate. A plurality of transparent medium layers are respectively located between every two adjacent ones of the reflective display panel and the electrical or optical element layers and above the electrical or optical element layers. A value of a refractive index of at least one of the transparent medium layers above the light guide plate is a minimum value among values of refractive indexes of the electrical or optical element layers and the transparent medium layers. The transparent medium layer located above the electrical or optical element layer most away from the reflective display panel among the electrical or optical element layers is formed by an environmental medium of a place where the display device is located. The transparent medium layer having a smallest refractive index is located between the electrical or optical element layer most away from the reflective display panel and the reflective display panel when the light guide plate is not the electrical or optical element layer most away from the reflective display panel.

In an embodiment of the invention, the transparent medium layer having the smallest refractive index is located between two adjacent ones of the electrical or optical element layers, and a refractive index of the transparent medium layer having the smallest refractive index is less than refractive indexes of the two adjacent ones of the electrical or optical element layers.

In an embodiment of the invention, a refractive index of the transparent medium layer located above the electrical or optical element layer most away from the reflective display panel is less than the refractive indexes of the two adjacent ones of the electrical or optical element layers.

In an embodiment of the invention, the transparent medium layer having the smallest refractive index is located between two adjacent ones of the electrical or optical element layers, and a refractive index of the transparent medium layer having the smallest refractive index is less than or equal to the refractive index of the transparent medium layer located above the electrical or optical element layer most away from the reflective display panel among the electrical or optical element layers.

In an embodiment of the invention, the electrical or optical element layers include a first electrical or optical element layer, a second electrical or optical element layer and a third electrical or optical element layer which are sequentially stacked up from the reflective display device; and the transparent medium layers include a first transparent medium layer located between the reflective display panel and the first electrical or optical element layer, a second transparent medium layer located between the first electrical or optical element layer and the second electrical or optical element layer, and a third transparent medium layer located between the second electrical or optical element layer and the third electrical or optical element layer.

In an embodiment of the invention, the third electrical or optical element layer is the light guide plate, and refractive indexes of the first transparent medium layer, the second transparent medium layer and the third transparent medium layer are substantially identical to one other.

In an embodiment of the invention, the second electrical or optical element layer is the light guide plate, a refractive index of the third transparent medium layer is less than a refractive index of the second transparent medium layer, and the refractive index of the third transparent medium layer is less than a refractive index of the first transparent medium layer.

In an embodiment of the invention, the first electrical or optical element layer is the light guide plate, a refractive index of the second transparent medium layer is less than or equal to a refractive index of the third transparent medium layer, and the refractive index of the second transparent medium layer is less than or equal to a refractive index of the first transparent medium layer.

In an embodiment of the invention, the first electrical or optical element layer is the light guide plate, a refractive index of the third transparent medium layer is less than a refractive index of the second transparent medium layer, and the refractive index of the third transparent medium layer is less than a refractive index of the first transparent medium layer.

In an embodiment of the invention, the electrical or optical element layers include the light guide plate and at least one of a touch panel, a cover lens and an anti-glare film.

In an embodiment of the invention, the electrical or optical element layer most away from the reflective display panel is a cover lens, the gas layer is located between the cover lens and the light guide plate, and a printing layer is provided at an edge of the cover lens.

In the display device according to the embodiments of the invention, since at least one of transparent medium layers above the light guide plate is the gas layer or the transparent medium layer having the smallest refractive index among the refractive indexes of the electrical or optical element layers and the transparent medium layers, a larger proportion of the light beam transmitted in the light guide plate may be totally internally reflected by the interface located above. As a result, the coupling light leakage at the edge of the display device may be suppressed according to the embodiments of the invention.

To make the above features and advantages of the disclosure more comprehensible, several embodiments accompanied with drawings are described in detail as follows.

DESCRIPTION OF THE EMBODIMENTS

Figure 1:
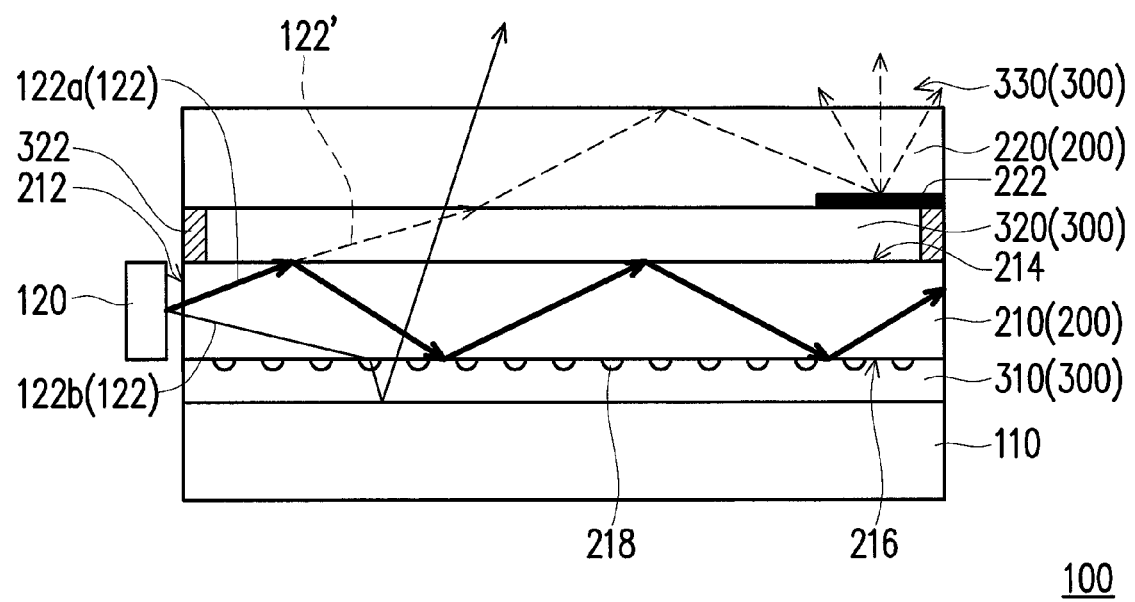
FIG. 1 is a schematic sectional view of a display device according to an embodiment of the invention.

FIG. 1 is a schematic sectional view of a display device according to an embodiment of the invention. Referring to FIG. 1, a display device 100 of the present embodiment includes a reflective display panel 110, a plurality of electrical or optical element layers 200, and at least one light-emitting element 120. The electrical or optical element layers 200 are stacked above the reflective display panel 110 and one of the electrical or optical element layers 200 is a light guide plate. In the present embodiment, among the electrical or optical element layers 200, an electrical or optical element layer 210 is the light guide plate, and an electrical or optical element layer 220 is a cover lens. The light-emitting element 120 is disposed beside the light guide plate (i.e., the electrical or optical element layer 210) and configured to emit a light beam 122, and the light beam 122 enters inside the light guiding plate through a lateral side 212 of the light guide plate. A plurality of transparent medium layers 300 are respectively located between every two adjacent ones of the reflective display panel 110 and the electrical or optical element layers 200 and above the electrical or optical element layer most away from the reflective display panel among the electrical or optical element layers 200. For instance, a transparent medium layer 310 is located between the reflective display panel 110 and the electrical or optical element layer 210; a transparent medium layer 320 is located between the electrical or optical element layer 210 and the electrical or optical element layer 220; and a transparent medium layer 330 is located above the electrical or optical element layer 220. The transparent medium layer (i.e., the transparent medium layer 330) located above the electrical or optical element layer (i.e., the electrical or optical element layer 220) most away from the reflective display panel among the electrical or optical element layers 200 is formed by an environmental medium of a place where the display device 100 is located.

In the present embodiment, the lateral side 212 of the electrical or optical element layer 210 (i.e., the light guide plate) is a light incident surface. The electrical or optical element layer 210 further includes a first surface 214 and a second surface 216 opposite to each other, and the lateral side 212 connects the first surface 214 and the second surface 216. In the present embodiment, the light-emitting element 120, for example, is a light-emitting diode (LED) or a cold cathode fluorescent lamp (CCFL). When the light-emitting element 120 is the light-emitting diode, one or more of the light-emitting diodes being arranged beside the lateral side 212 may be adopted. After the light beam 122 emitted by the light-emitting element 120 enters the lateral side 212, most of the light beam 122 is constantly reflected by the first surface 214 and the second surface 216. A plurality of optical microstructures 218 disposed on the second surface are capable of destructing said reflection condition, so that a portion of the light beam 122 (e.g., a light beam 122b) may be scattered towards the reflective display panel 110. In other embodiments, the optical microstructures 218 may also be disposed on the first surface 214, or the optical microstructures 218 may be disposed on both the first surface 214 and the second surface 216.

In the present embodiment, the reflective display panel 110 is an electrophoretic display panel such as an electronic paper display panel capable of reflecting an ambient light and the light beam 122b, so that the ambient light or the light beam 122b may be reflected to pass through the transparent medium layers 300 and the electrical or optical element layers 200 alternately to be transmitted to eyes of a user. Accordingly, the user may view the screen displayed by the reflective display panel 110.

Figure 2:
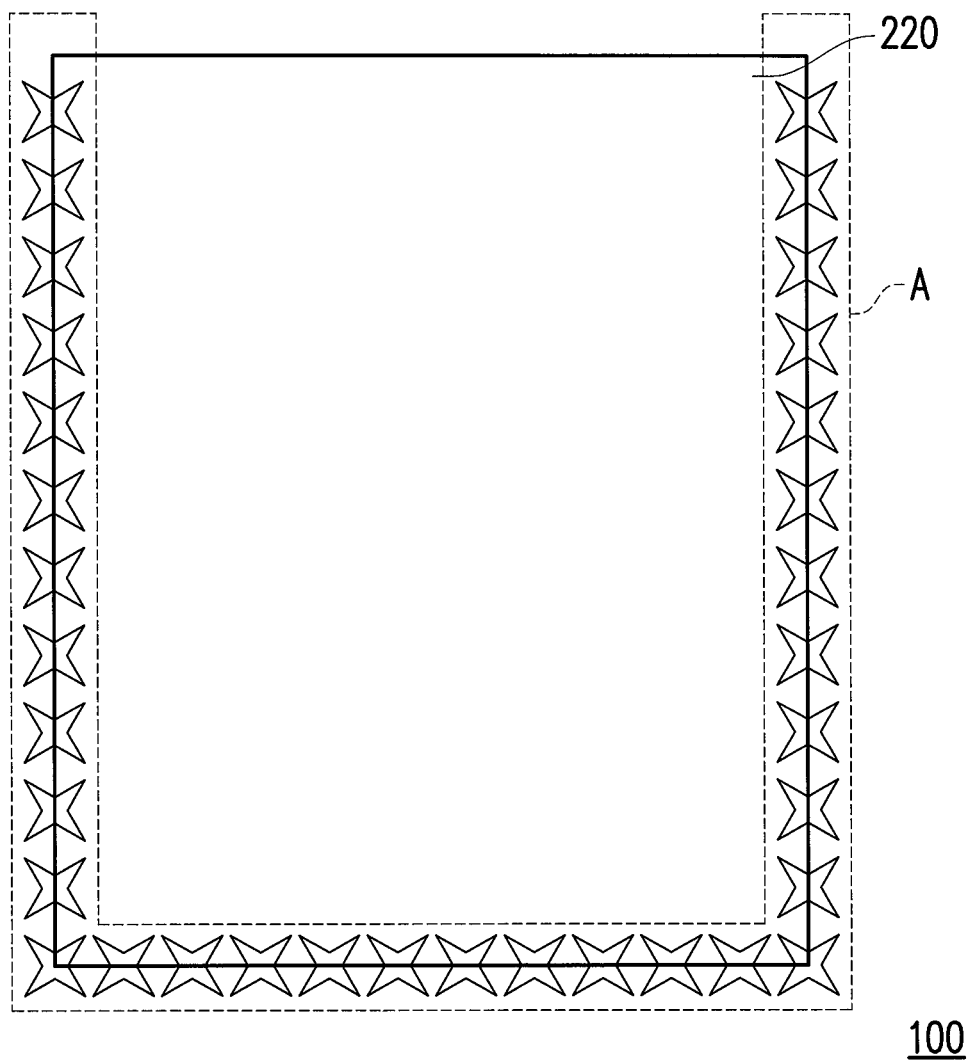
FIG. 2 is a top view of the display device of FIG. 1 in a hypothetical state.

However, assuming that a refractive index of the transparent medium layer 320 is overly high (e.g., when the transparent medium layer 320 adopts the optically-clear adhesive (OCA) having a higher refractive index) and approaching to a refractive index of the electrical or optical element layer 210, after a light beam 122a is incident on the first surface 214, most of the light beam 122a may be refracted by the first surface 214 and transmitted to the electrical or optical element layer 220 (i.e., the cover lens). Namely, most of the light beam 122a may be transmitted along a path illustrated in a dash line (i.e., a traveling path of a light path 122') to a printing layer 222 (e.g., formed by curing ink) at an edge of the cover lens. The printing layer 222 may reflect or scatter the light beam 122', such that the coupling light leakage may occur at the edge of the display device 100. FIG. 2 is a top view of the display device 100 of FIG. 1 in a hypothetical state. In view of FIG. 2, it can be known that, when the transparent medium layer 320 of the display device 100 includes the refractive index being overly high, the coupling light leakage may occur on an edge region A of the display device 100.

In order to solve such problem, at least one of the transparent medium layers (e.g., the transparent medium layer 320 as in the present embodiment) above the light guide plate (e.g., the electrical or optical element layer 210 as in the present embodiment) may be a gas layer including, for example, air or other gases. Since a refractive index of the gas layer may be a lot lower than a refractive index of the light guide plate, most of the light beam 122a incident on the first surface 214 may be totally internally reflected by the first surface 214. Accordingly, most of the light beam 122a may not travel along the path illustrated in said dash line, thus most of the light beam 122a may not become the light beam 122' which is transmitted to the printing layer 222 and reflected or scattered by the printing layer 222. Therefore, the coupling light leakage at the edge of the display device 100 may be effectively suppressed. In addition, when the light guide plate is not the electrical or optical element layer (e.g., the electrical or optical element layer 220 as in the present embodiment) most away from the reflective display panel among the electrical or optical element layers 200 (i.e., the light guide plate is not located at the top layer), the gas layer is located between the electrical or optical element layer (i.e., the electrical or optical element layer 220) most away from the reflective display panel 110 among the electrical or optical element layers 200 and the reflective display panel 110. In other words, even if the environmental medium is air at the place where the display device 100 is located, said gas layer refers the gas layer or an air layer (i.e., the transparent medium layer 320) inside of the display device 100 instead of the gas layer formed by the environmental medium.

Further, in another embodiment, when the light guide plate is the electrical or optical element layer (i.e., the electrical or optical element layer 220) most away from the reflective display panel 110 among the electrical or optical element layers 200, the gas layer refers to the gas layer formed by the environmental medium where the display panel 100 is located (e.g., the air layer) above the light guide plate. In this case, since the refractive index of the environmental medium is a lot less than the refractive index of the light guide plate, most of the light beam 212 may be totally internally reflected by the interface between the light guide plate and the environmental medium, so as to effectively suppressing the coupling light leakage at the edge of the display device 100.

Referring back to FIG. 1, in other embodiments, in order to solve the coupling light leakage at the edge of the display device 100, a value of a refractive index of at least one of the transparent medium layers (e.g., the transparent medium layer 320) above the light guide plate may also be a minimum value among values of refractive indexes of the electrical or optical element layers 200 and the transparent medium layers 300. In other words, if a medium of the transparent medium layer 330 (which is formed by the environmental medium of the display device 100) is air, the transparent medium layer 320 may also be the air layer. Accordingly, the values of the refractive indexes of the transparent medium layer 320 and the transparent medium layer 330 are both the minimum value among the values of the refractive indexes of the electrical or optical element layers 200 and the transparent medium layers 300. However, in case the environmental medium is water, the transparent medium layer 320 may be water or an oil layer having a refractive index less than that of water.

In addition, when the light guide plate is not the electrical or optical element layer (e.g., the electrical or optical element layer 220) most away from the reflective display panel among the electrical or optical element layers 200, the transparent medium layer having a smallest refractive index (i.e., the transparent medium layer 320) is located between the electrical or optical element layer (i.e., the electrical or optical element layer 220) most away from the reflective display panel 110 among the electrical or optical element layers 200 and the reflective display panel 110. However, when the light guide plate is the electrical or optical element layer (i.e., the electrical or optical element layer 220) most away from the reflective display panel among the electrical or optical element layers 200, the transparent medium layer 300 having the smallest refractive index refers to the transparent medium layer 330 located above the light guide plate and formed by the environmental medium of the display device 100.

In the present embodiment, the transparent medium layer 320 is the gas layer, thus a spacer 322 is further disposed between the electrical or optical element layer 210 and the electrical or optical element layer 220, so that the electrical or optical element layer 210 may keep a distance away from the 220. In the present embodiment, the spacer 322 is, for example, a frame surrounding the transparent medium layer 320. Further, in the present embodiment, the transparent medium layer 310 is the optically-clear adhesive. Nevertheless, in other embodiments, the transparent medium layer 310 may also be the gas layer, the air layer or a liquid layer.

In case the transparent medium layers 300 are in liquid state or gaseous state and the transparent medium layer is not the transparent medium layer 330 formed by the environmental medium, the spacer 322 as depicted in FIG. 1 may be provided beside the transparent medium layers 300, so as to space apart two adjacent ones of electrical or optical element layers 210, or to space apart the adjacent electrical or optical element layer 210 from the reflective display panel 110.

In the present embodiment, the electrical or optical element layer (i.e., the electrical or optical element layer 220) most away from the reflective display panel 110 among the electrical or optical element layers 200 is the cover lens, and the gas layer is located between the cover lens and the light guide plate (i.e., the electrical or optical element layer 210). However, in other embodiments, the electrical or optical element layers 200 include the light guide plate, and at least one of a touch panel, a cover lens and an anti-glare film. The touch panel may be, for example, a capacitive touch panel, a resistance touch panel, an optical touch panel all having light transmittance or other appropriate touch panels. For instance, when the electrical or optical element layer 210 is the light guide plate, the electrical or optical element layers 220 may be the touch panel, the cover lens or the anti-glare film. In addition, when the electrical or optical element layer 220 is the light guide plate, the electrical or optical element layer 210 may be the touch panel, the cover lens or the anti-glare film. In addition, the transparent medium layers 300 may be gas, air, liquid (e.g., water or oil), the optically-clear adhesive, or a combination thereof.

In order to effectively suppress the coupling light leakage at the edge of the display device 100 while improving a light utilization of the display device 100, the display device 100 is required to meet at least one of conditions as listed below.

1. The gas layer is located between two adjacent ones of the electrical or optical element layers 200, and a refractive index of the gas layer is less than refractive indexes of the two adjacent ones of the electrical or optical element layers 200. That is to say, according the present embodiment, the refractive index of the gas layer (i.e., the transparent medium layer 320) is less than the refractive indexes of the electrical or optical element layer 210 and the electrical or optical element layer 220.

2. A refractive index of the transparent medium layer 330 (i.e., the refractive index of the environmental medium) located above the electrical or optical element layer most away from the reflective display panel 110 among the electrical or optical element layers 200 is less than refractive indexes of the two adjacent ones of the electrical or optical element layers 200 (i.e., the electrical or optical element layers 210 and 220 as in the present embodiment) sandwiching the gas layer.

3. The gas layer is located between two adjacent ones of the electrical or optical element layers 200, and a refractive index of the gas layer is less than or equal to a refractive index of the transparent medium layer (i.e., the environmental medium) located above the electrical or optical element layer most away from the reflective display panel 110 among the electrical or optical element layers 200.

Or, in another embodiment, the display device 100 may also be required to meet at least one of conditions listed below.

1. One having the smallest refractive index among the transparent medium layers 300 is located between two adjacent ones of the electrical or optical element layers 200, and a refractive index of the one having the smallest refractive index among the transparent medium layers 300 is less than refractive indexes of the two adjacent ones of the electrical or optical element layers 200.

2. A refractive index of the transparent medium layer 330 located above the one most away from the reflective display panel among the electrical or optical element layers 200 (i.e., the refractive index of the environmental medium) is less than the refractive indexes of the two adjacent ones of the electrical or optical element layers 200 sandwiching the one having the smallest refractive index among the transparent medium layers 300.

3. The one having the smallest refractive index among the transparent medium layers 300 is located between two adjacent ones of the electrical or optical element layers 200, and a refractive index of the one having the smallest refractive index among the transparent medium layers 300 is less than or equal to the refractive index of the transparent medium layer 330 located above the electrical or optical element layer most away from the reflective display panel 110 among the electrical or optical element layers 200 (i.e., the refractive index of the environmental medium).

An amount of the electrical or optical element layers 200 stacked above the reflective display panel 110 in the display device 100 is not particularly limited in the invention. Among the electrical or optical element layers 200, one of the electrical or optical element layers 200 is the light guide plate, whereas the rest of the electrical or optical element layers 200 may be the touch panel, the cover lens, the anti-glare film, other optical films or a combination thereof. An embodiment illustrating three of the electrical or optical element layers 200 is provided below.

Figure 3:
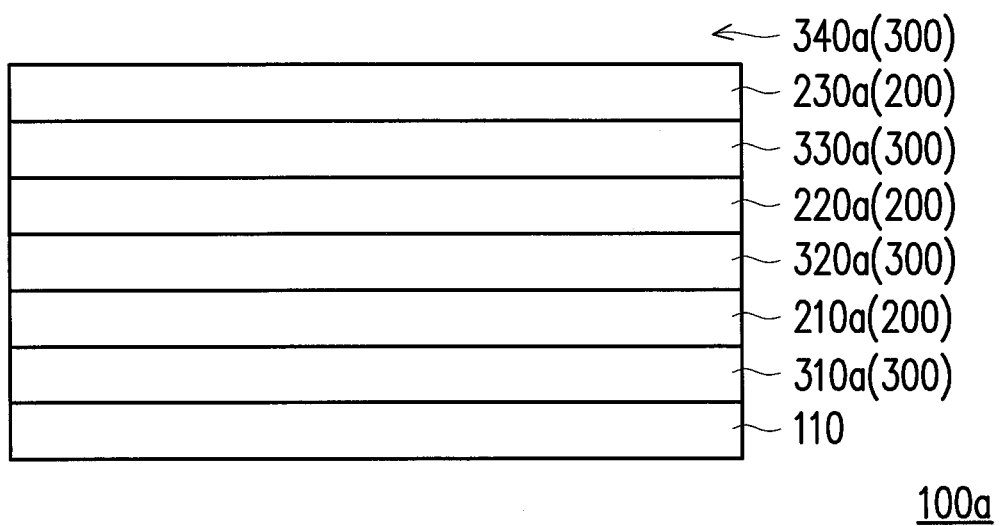
FIG. 3 is a schematic sectional view of a display device according to another embodiment of the invention.

FIG. 3 is a schematic sectional view of a display device according to another embodiment of the invention. Referring to FIG. 3, a display device 100a of the present embodiment is similar to the display device 100 of FIG. 1, and a difference between the two is described as below. In the display device 100a of the present embodiment, the electrical or optical element layers 200 include a first electrical or optical element layer 210a, a second electrical or optical element layer 220a and a third electrical or optical element layer 230a which are sequentially stacked up from the reflective display device 110; and the transparent medium layers 300 include a first transparent medium layer 310a located between the reflective display panel 110 and the first electrical or optical element layer 210a, a second transparent medium layer 320a located between the first electrical or optical element layer 210a and the second electrical or optical element layer 220a, and a third transparent medium layer 330a located between the second electrical or optical element layer 220a and the third electrical or optical element layer 230a. In addition, one of the transparent medium layers 300 above the third electrical or optical element layer 230a is a transparent medium layer 340a formed by the environmental medium.

In an embodiment, when the third electrical or optical element layer 230a is the light guide plate, refractive indexes of the first transparent medium layer 310a, and the second transparent medium layer 320a and the third transparent medium layer 330a may be substantially identical to one other, such that an overall light emitting efficiency provided by the display device 100a may be improved.

In an embodiment, when the second electrical or optical element layer 220a is the light guide plate, a refractive index of the third transparent medium layer 330a is less than a refractive index of the second transparent medium layer 320a, and the refractive index of the third transparent medium layer 330a is less than a refractive index of the first transparent medium layer 310a. For instance, the medium of the third transparent medium layer 330a may be gas or air, so that most of the light beam from the light-emitting element may be totally internally reflected by an interface between the third transparent medium layer 330a and the second electrical or optical element layer 220a (i.e., the light guide plate). As a result, the coupling light leakage at the edge of the display device 100a may be effectively suppressed.

In an embodiment, when the first electrical or optical element layer 210a is the light guide plate, a refractive index of the second transparent medium layer 320a may be less than or equal to a refractive index of the third transparent medium layer 330a, and the refractive index of the second transparent medium layer 320a may be less than or equal to a refractive index of the first transparent medium layer 310a. For instance, the medium of the second transparent medium layer 320a may be gas or air, so that most of the light beam from the light-emitting element may be totally internally reflected by an interface between the second transparent medium layer 320a and the first electrical or optical element layer 210a (i.e., the light guide plate). As a result, the coupling light leakage at the edge of the display device 100a may be effectively suppressed.

In an embodiment, when the first electrical or optical element layer 210a is the light guide plate, a refractive index of the third transparent medium layer 330a may be less than a refractive index of the second transparent medium layer 320a, and the refractive index of the third transparent medium layer 330a may be less than a refractive index of the first transparent medium layer 310a. For instance, the medium of the third transparent medium layer 330a may be gas or air, so that most of the light beam from the light-emitting element may be totally internally reflected by an interface between the third transparent medium layer 330a and the second electrical or optical element layer 220a. As a result, the coupling light leakage at the edge of the display device 100a may be effectively suppressed.

In the embodiments of FIG. 3, although it is not illustrated in FIG. 3, the light-emitting element as depicted in FIG. 1 may be disposed beside the electrical or optical element layers 200 serving as the light guide plate. Furthermore, although it is not illustrated in FIG. 3, the optical microstructures (e.g., the optical microstructures 218 as depicted in FIG. 1) may be disposed on a surface of the one serving as the light guide plate among the electrical or optical element layers 200. Moreover, if the transparent medium layers 300 (excluding the transparent medium layer 340a formed by the environmental medium) are in liquid state or gaseous state, although it is not illustrated in FIG. 3, the spacer 322 as depicted in FIG. 1 may space apart the electrical or optical element layers 200 at two sides of the transparent medium layers 300.

Based on above, in the display device according to the embodiments of the invention, since at least one of transparent medium layers above the light guide plate is the gas layer or the transparent medium layer having the smallest refractive index among the refractive indexes of the electrical or optical element layers and the transparent medium layers, a larger proportion of the light beam transmitted in the light guide plate may be totally internally reflected by the interface located above. As a result, the coupling light leakage at the edge of the display device may be suppressed according to the embodiments of the invention.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A display device, comprising:
a reflective display panel;
a plurality of electrical or optical element layers, stacked above the reflective display panel, wherein one of the electrical or optical element layers is a light guide plate; and
at least one light-emitting element, disposed beside the light guide plate and configured to emit a light beam, and the light beam entering inside the light guiding plate through a lateral side of the light guide plate, wherein a plurality of transparent medium layers are respectively located between every two adjacent ones of the reflective display panel and the electrical or optical element layers and above the electrical or optical element layer most away from the reflective display panel among the electrical or optical element layers, at least one of the transparent medium layers above the light guide plate is a gas layer, the transparent medium layer located above the electrical or optical element layer most away from the reflective display panel among the electrical or optical element layers is formed by an environmental medium of a place where the display device is located, and the gas layer is located between the electrical or optical element layer most away from the reflective display panel and the reflective display panel when the light guide plate is not the electrical or optical element layer most away from the reflective display panel,
wherein the electrical or optical element layer most away from the reflective display panel is a cover lens, the gas layer is located between the cover lens and the light guide plate, and a printed layer is provided at an edge of the cover lens,
wherein the electrical or optical element layers comprise a first electrical or optical element layer, a second electrical or optical element layer and a third electrical or optical element layer which are sequentially stacked up from the reflective display device, and the transparent medium layers comprise a first transparent medium layer located between the reflective display panel and the first electrical or optical element layer, a second transparent medium layer located between the first electrical or optical element layer and the second electrical or optical element layer, and a third transparent medium layer located between the second electrical or optical element layer and the third electrical or optical element layer, wherein the first electrical or optical element layer is the light guide plate, a refractive index of the second transparent medium layer is less than or equal to a refractive index of the third transparent medium layer, and the refractive index of the second transparent medium layer is less than or equal to a refractive index of the first transparent medium layer, and
wherein the first transparent medium layer is gas, air, liquid, an optically-clear adhesive or a combination thereof, and the third transparent medium layer is gas, air, liquid, an optically-clear adhesive or a combination thereof.

2. The display device of claim 1, wherein the gas layer is located between two adjacent ones of the electrical or optical element layers, and a refractive index of the gas layer is less than refractive indexes of the two adjacent ones of the electrical or optical element layers.

3. The display device of claim 2, wherein a refractive index of the transparent medium layer located above the electrical or optical element layer most away from the reflective display panel is less than the refractive indexes of the two adjacent ones of the electrical or optical element layers sandwiching the gas layer.

4. The display device of claim 1, wherein the gas layer is located between two adjacent ones of the electrical or optical element layers, and a refractive index of the gas layer is less than or equal to a refractive index of the transparent medium layer located above the electrical or optical element layer most away from the reflective display panel.

5. The display device of claim 1, wherein the electrical or optical element layers comprise the light guide plate and at least one of a touch panel, a cover lens and an anti-glare film.

6. A display device, comprising:
a reflective display panel;
a plurality of electrical or optical element layers, stacked above the reflective display panel, wherein one of the electrical or optical element layers is a light guide plate; and
at least one light-emitting element, disposed beside the light guide plate and configured to emit a light beam, and the light beam entering inside the light guiding plate through a lateral side of the light guide plate, wherein a plurality of transparent medium layers are respectively located between every two adjacent ones of the reflective display panel and the electrical or optical element layers and above the electrical or optical element layers, a value of a refractive index of at least one of the transparent medium layers above the light guide plate is a minimum value among values of refractive indexes of the electrical or optical element layers and the transparent medium layers, the transparent medium layer located above the electrical or optical element layer most away from the reflective display panel among the electrical or optical element layers is formed by an environmental medium of a place where the display device is located, and the transparent medium layer having a smallest refractive index is located between the electrical or optical element layer most away from the reflective display panel and the reflective display panel when the light guide plate is not the electrical or optical element layer most away from the reflective display panel,
wherein the electrical or optical element layer most away from the reflective display panel is a cover lens, the gas layer is located between the cover lens and the light guide plate, and a printed layer is provided at an edge of the cover lens,
wherein the electrical or optical element layers comprise a first electrical or optical element layer, a second electrical or optical element layer and a third electrical or optical element layer which are sequentially stacked up from the reflective display device, and the transparent medium layers comprise a first transparent medium layer located between the reflective display panel and the first electrical or optical element layer, a second transparent medium layer located between the first electrical or optical element layer and the second electrical or optical element layer, and a third transparent medium layer located between the second electrical or optical element layer and the third electrical or optical element layer, wherein the first electrical or optical element layer is the light guide plate, a refractive index of the second transparent medium layer is less than or equal to a refractive index of the third transparent medium layer, and the refractive index of the second transparent medium layer is less than or equal to a refractive index of the first transparent medium layer, and
wherein the first transparent medium layer is gas, air, liquid, an optically-clear adhesive or a combination thereof, and the third transparent medium layer is gas, air, liquid, an optically-clear adhesive or a combination thereof.

7. The display device of claim 6, wherein the transparent medium layer having the smallest refractive index is located between two adjacent ones of the electrical or optical element layers, and a refractive index of the transparent medium layer having the smallest refractive index is less than refractive indexes of the two adjacent ones of the electrical or optical element layers.

8. The display device of claim 7, wherein a refractive index of the transparent medium layer located above the electrical or optical element layer most away from the reflective display panel is less than the refractive indexes of the two adjacent ones of the electrical or optical element layers sandwiching the one having the smallest refractive index among the transparent medium layers.

9. The display device of claim 6, wherein the transparent medium layer having the smallest refractive index is located between two adjacent ones of the electrical or optical element layers, and a refractive index of the transparent medium layer having the smallest refractive index is less than or equal to the refractive index of the transparent medium layer located above the electrical or optical element layer most away from the reflective display panel.

10. The display device of claim 6, wherein the electrical or optical element layers comprise the light guide plate and at least one of a touch panel, a cover lens and an anti-glare film.

* * * * *